(12) United States Patent
Kruse et al.

(10) Patent No.: US 10,406,989 B2
(45) Date of Patent: Sep. 10, 2019

(54) VEHICLE ACCESSORY MOUNTING DEVICE

(71) Applicant: First Pull Co., Tower Lakes, IL (US)

(72) Inventors: John Steven Kruse, Tower Lakes, IL (US); Parth Mukesh Bhatt, Chicago, IL (US); Michael Thomas Matteo, Chicago, IL (US); Jeffrey Richard Condon, Glenview, IL (US); Michael Douglas Prince, Chicago, IL (US)

(73) Assignee: FIRST PULL CO., Tower Lakes, IL (US)

( * ) Notice: Subject to any disclaimer, the term of this patent is extended or adjusted under 35 U.S.C. 154(b) by 9 days.

(21) Appl. No.: 15/873,296

(22) Filed: Jan. 17, 2018

(65) Prior Publication Data

US 2019/0217787 A1    Jul. 18, 2019

(51) Int. Cl.
| | | |
|---|---|---|
| *B60R 9/06* | (2006.01) | |
| *B60R 9/10* | (2006.01) | |
| *B60R 9/12* | (2006.01) | |
| B60R 11/00 | (2006.01) | |
| B62D 43/02 | (2006.01) | |

(52) U.S. Cl.
CPC .............. *B60R 9/06* (2013.01); *B60R 9/10* (2013.01); *B60R 9/12* (2013.01); *B60R 2011/004* (2013.01); *B60R 2011/005* (2013.01); *B62D 43/02* (2013.01)

(58) Field of Classification Search
CPC .... B60R 9/06; B60R 9/10; B60R 9/12; B60R 2011/004; B60R 2011/005; B62D 43/02
USPC ........................................ 224/42.24
See application file for complete search history.

(56) References Cited

U.S. PATENT DOCUMENTS

| | | | | |
|---|---|---|---|---|
| 3,469,870 A | * | 9/1969 | Barkus | E04G 25/06 |
| | | | | 108/150 |
| 4,189,074 A | | 2/1980 | Davies | |
| 4,308,733 A | * | 1/1982 | Tampa | B62D 43/00 |
| | | | | 224/42.24 |
| 4,392,597 A | | 7/1983 | Traugh | |
| 4,498,614 A | * | 2/1985 | Guarr | B60R 11/06 |
| | | | | 224/42.13 |
| 4,598,848 A | * | 7/1986 | Clark | B62D 43/08 |
| | | | | 224/42.12 |
| 4,676,413 A | | 6/1987 | Began et al. | |
| 4,676,414 A | | 6/1987 | Deguevara | |
| 4,884,728 A | | 12/1989 | Temple | |
| 4,915,274 A | * | 4/1990 | Oliver | B62D 43/02 |
| | | | | 224/42.24 |

(Continued)

*Primary Examiner* — Justin M Larson
*Assistant Examiner* — Lester L Vanterpool
(74) *Attorney, Agent, or Firm* — Klintworth & Rozenblat IP LLP

(57) ABSTRACT

A vehicle accessory mounting device according to some embodiments of the disclosure is configured to attach accessories to a spare-tire hub assembly of a vehicle. The vehicle accessory mounting device includes a first member attached to the spare-tire hub assembly, a second member which is movable relative to the first member, and a handle which is movably attached to the second member. The second member includes pin ends which are configured to engage within slots in the first member. A locking protrusion is provided to lock the second member into place relative to the first member. A locking assembly is provided to lock the handle into place relative to the second member.

22 Claims, 16 Drawing Sheets

(56) References Cited

U.S. PATENT DOCUMENTS

| | | | |
|---|---|---|---|
| 4,948,021 A | 8/1990 | Murphy et al. | |
| 5,004,133 A | 4/1991 | Wyers | |
| 5,007,567 A | 4/1991 | Foster | |
| 5,085,360 A | 2/1992 | Fortune et al. | |
| 5,118,017 A * | 6/1992 | Buck | B62D 43/02 224/42.13 |
| 5,137,192 A * | 8/1992 | Sheridan | B62D 43/02 211/17 |
| 5,228,606 A | 7/1993 | Hickson | |
| 5,372,287 A | 12/1994 | Deguevara | |
| 6,695,185 B2 | 2/2004 | Church | |
| 6,749,094 B1 * | 6/2004 | Dexel | B62D 43/007 224/42.24 |
| 6,910,669 B2 * | 6/2005 | Gates | B62D 43/02 224/42.13 |
| 7,036,697 B2 | 5/2006 | Hwang et al. | |
| 7,980,781 B2 * | 7/2011 | Trice | B25G 1/04 403/109.3 |
| 8,387,839 B2 * | 3/2013 | Sautter | B60R 9/06 224/42.13 |
| 8,955,725 B2 * | 2/2015 | Turner | B60R 9/06 224/42.12 |
| 9,326,596 B2 * | 5/2016 | Larimer | A47B 3/083 |
| 2006/0091167 A1 * | 5/2006 | Bishop | B60R 9/06 224/42.21 |
| 2009/0242065 A1 * | 10/2009 | Whitling | F16B 7/042 138/120 |
| 2011/0133438 A1 * | 6/2011 | Haines | B60R 9/0426 280/769 |
| 2014/0145042 A1 * | 5/2014 | Adamson | F16M 11/046 248/125.8 |
| 2015/0069103 A1 * | 3/2015 | Fife | B60R 7/14 224/555 |
| 2017/0072856 A1 | 3/2017 | Varick | |

* cited by examiner

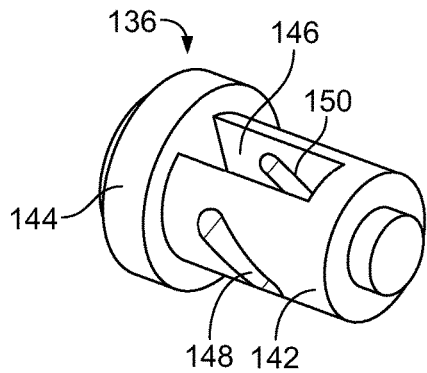
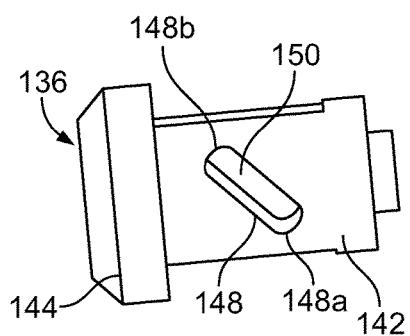
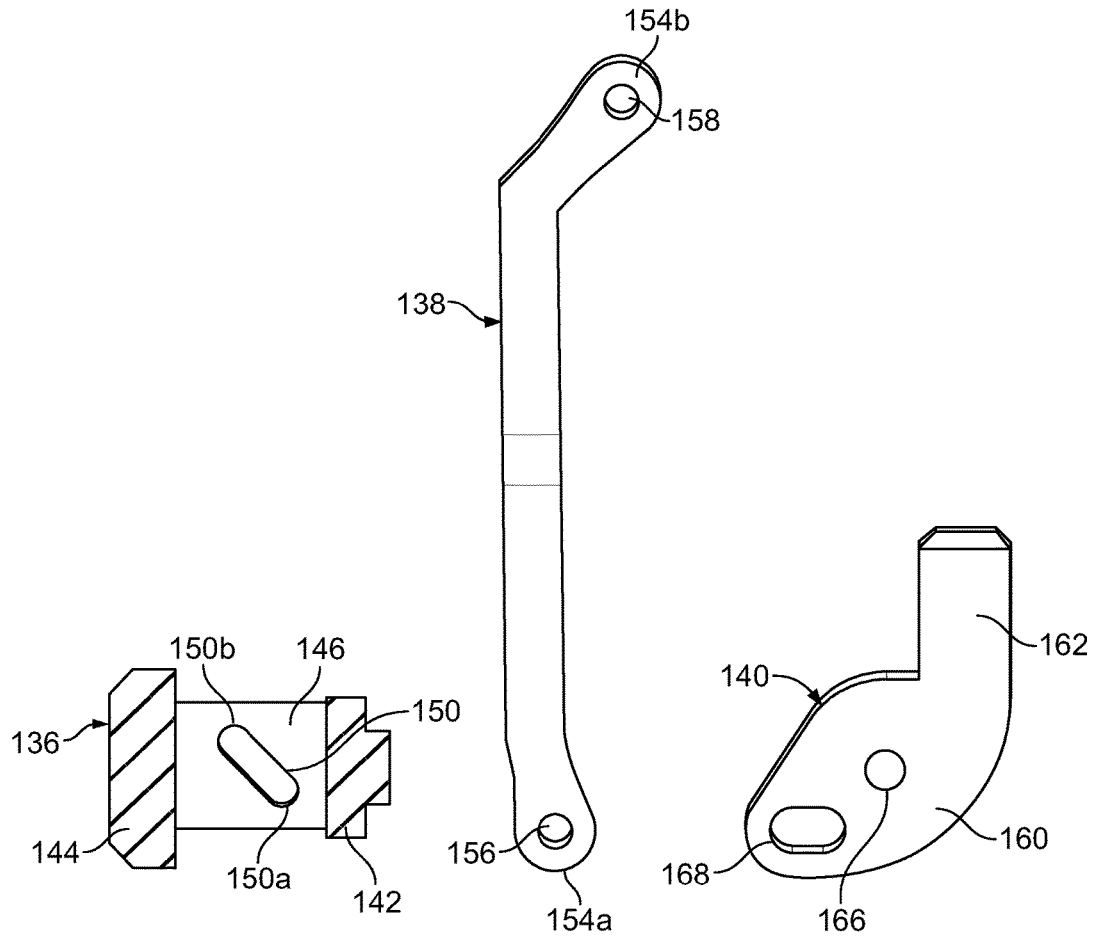
FIG. 24  FIG. 25
FIG. 26  FIG. 27  FIG. 28

VEHICLE ACCESSORY MOUNTING DEVICE

FIELD OF THE DISCLOSURE

The present disclosure relates to a vehicle accessory mounting device configured to attach accessories to a spare-tire hub assembly of a vehicle.

BACKGROUND

Vehicle accessory mounting devices have been provided for attaching accessories, such as baskets, ski racks, bike racks, and the like, to a vehicle. Such vehicle accessory mounting devices are commonly attached to a hitch or a spare-tire hub assembly of the vehicle.

SUMMARY

A vehicle accessory mounting device according to some embodiments of the disclosure is configured to attach accessories to a spare-tire hub assembly of a vehicle. The vehicle accessory mounting device includes a first member attached to the spare-tire hub assembly, a second member which is movable relative to the first member, and a handle which is movably attached to the second member. The second member includes pin ends which are configured to engage within slots in the first member. A locking protrusion is provided to lock the second member into place relative to the first member. A locking assembly is provided to lock the handle into place relative to the second member.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIG. 24 is a perspective view of a button of the vehicle accessory mounting device;

FIG. 25 is a front elevation view of the button;

FIG. 26 is a cross-sectional view of the button;

FIG. 27 is a front elevation view of a lower link member of the vehicle accessory mounting device;

FIG. 28 is a front elevation view of an upper link member of the vehicle accessory mounting device;

DETAILED DESCRIPTION

Figure 1:
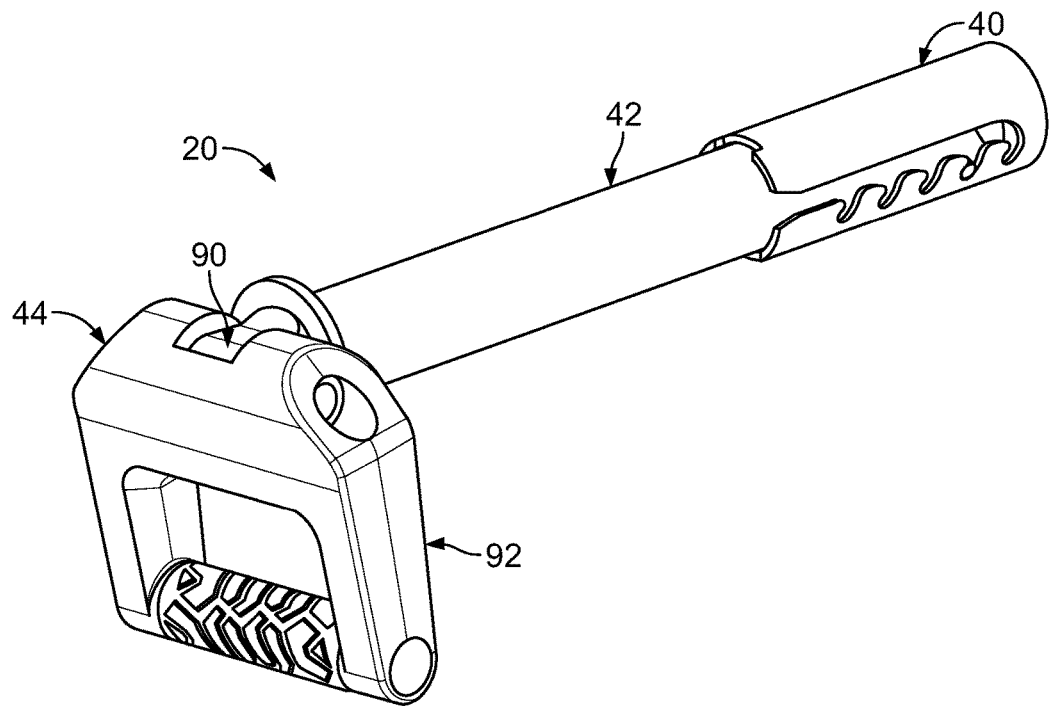
FIG. 1 is a perspective view of a vehicle accessory mounting device in an accordance with an embodiment of the disclosure.

While the disclosure may be susceptible to embodiment in different forms, there is shown in the drawings, and herein will be described in detail, specific embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Figure 2:
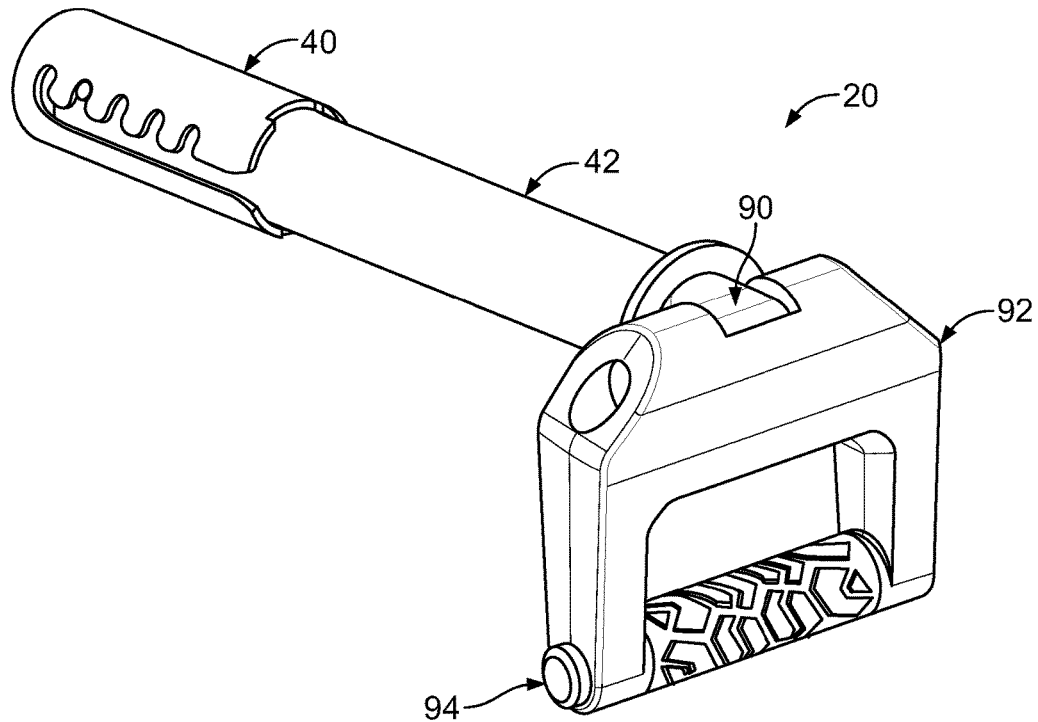
FIG. 2 is an alternative perspective view of the vehicle accessory mounting device.
Figure 4:
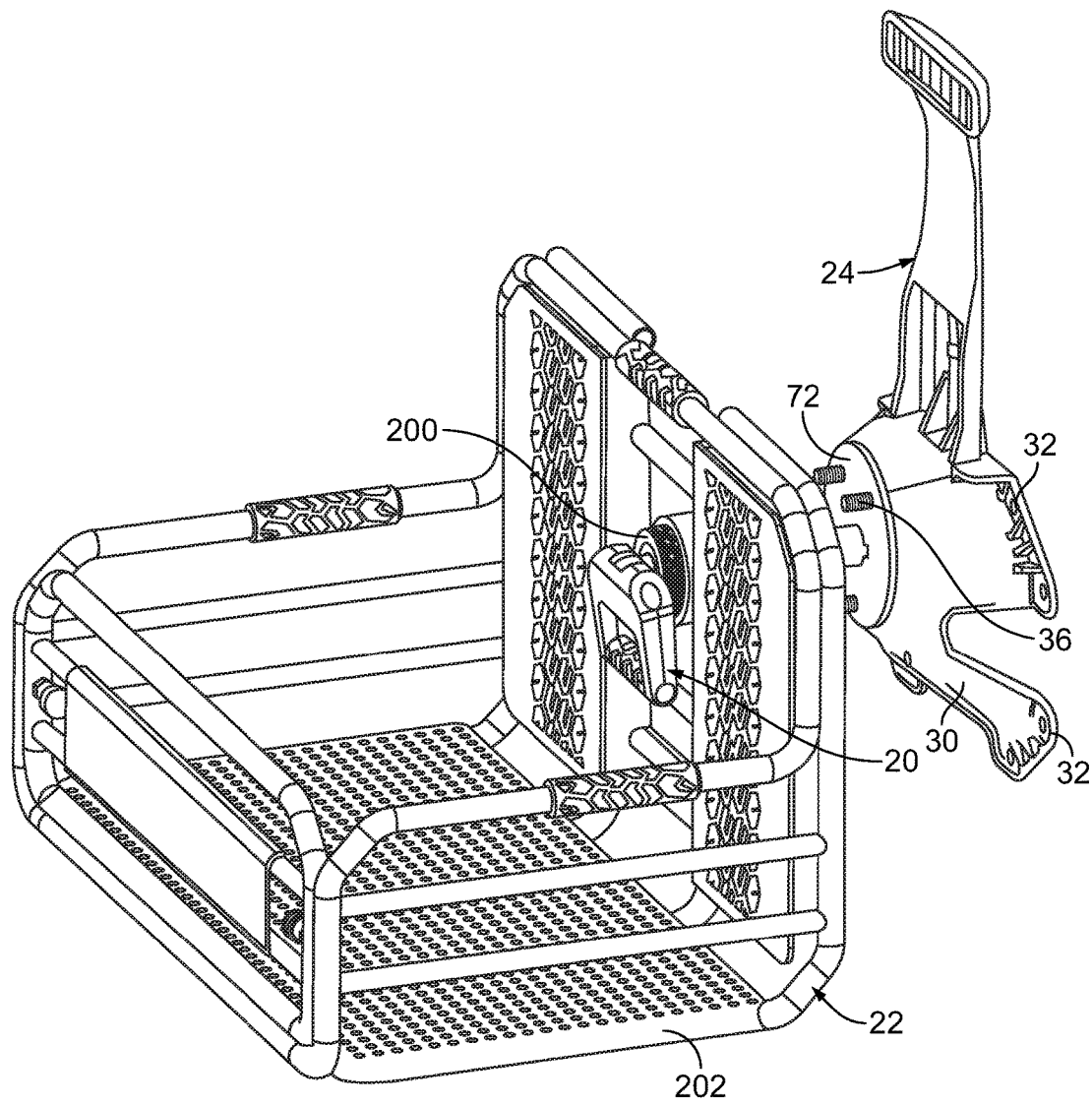
Figure 5:
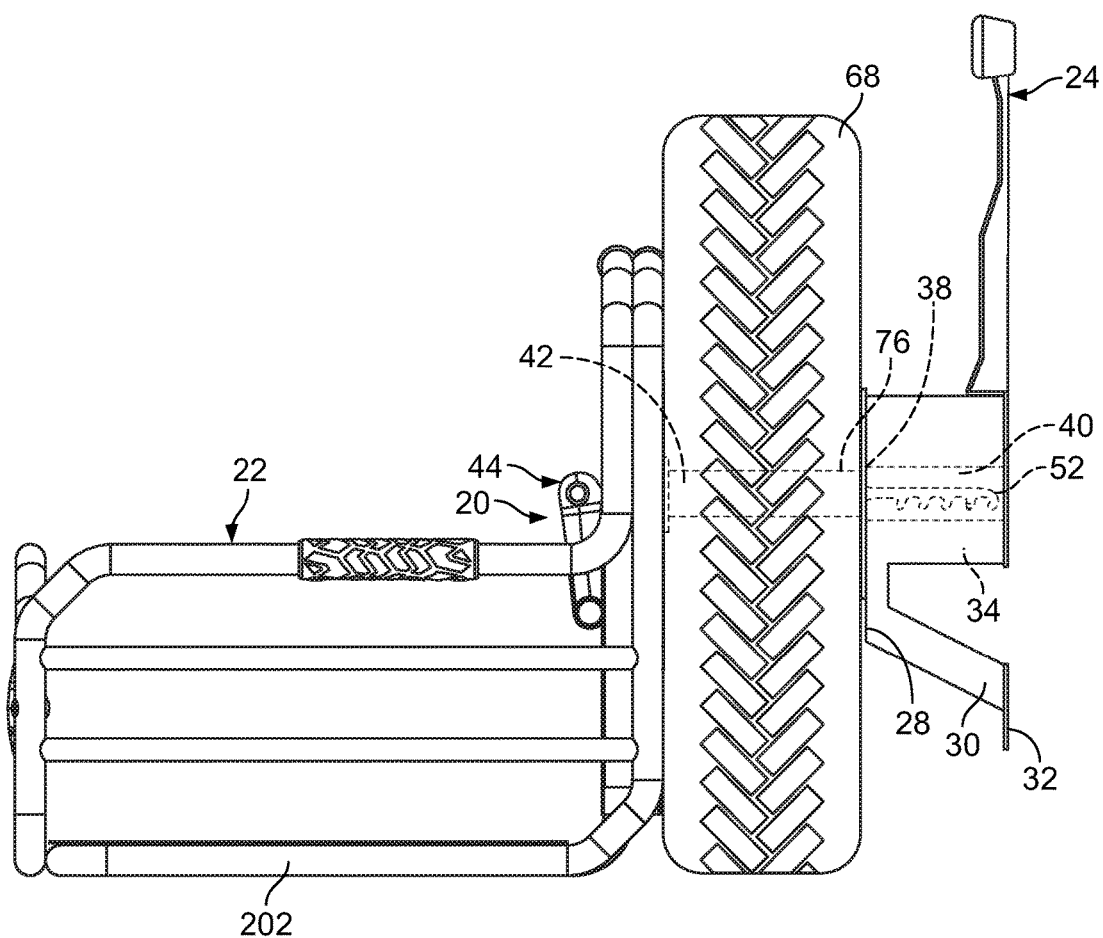
FIG. 5 is an elevation view of the vehicle accessory mounting device mounted on a spare-tire hub assembly of the vehicle with the accessory shown in FIG. 4.
Figure 6:
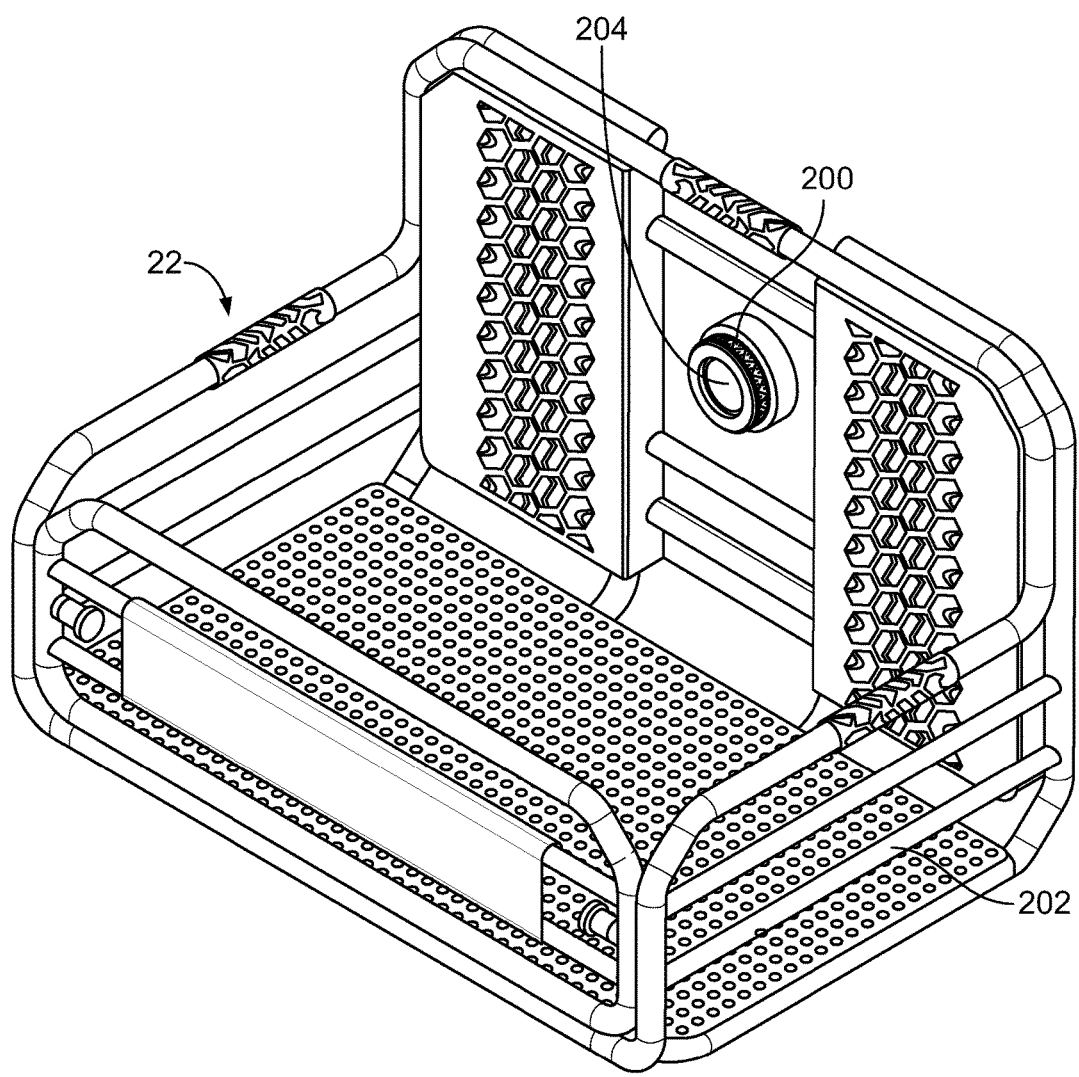
FIG. 6 is a perspective view of the accessory shown in FIG. 4.
Figure 7:
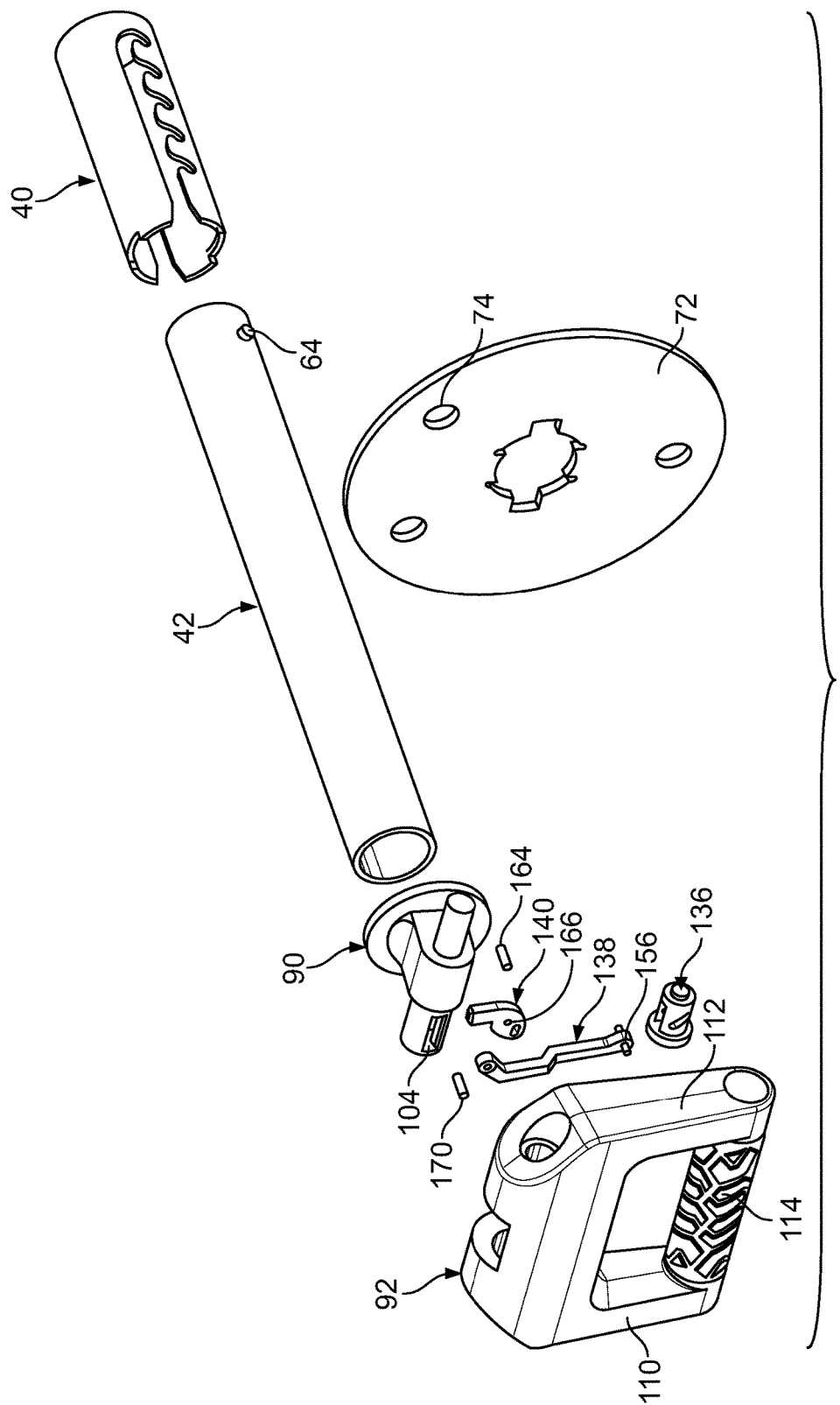
FIG. 7 is an exploded perspective view of the vehicle accessory mounting device in an accordance with an embodiment of the disclosure.
Figure 8:
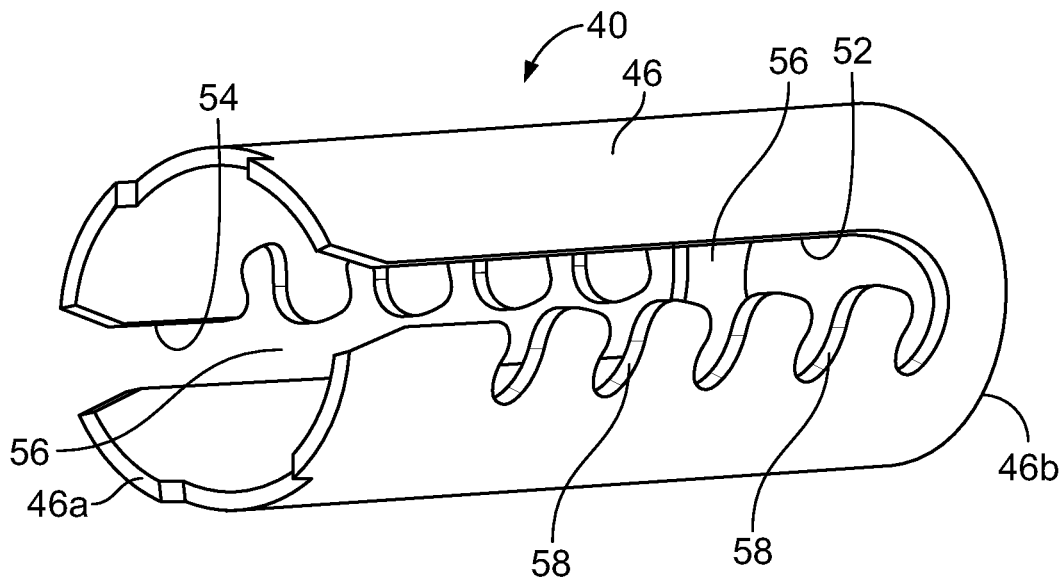
FIG. 8 is a perspective view of a first member of the vehicle accessory mounting device.
Figure 9:
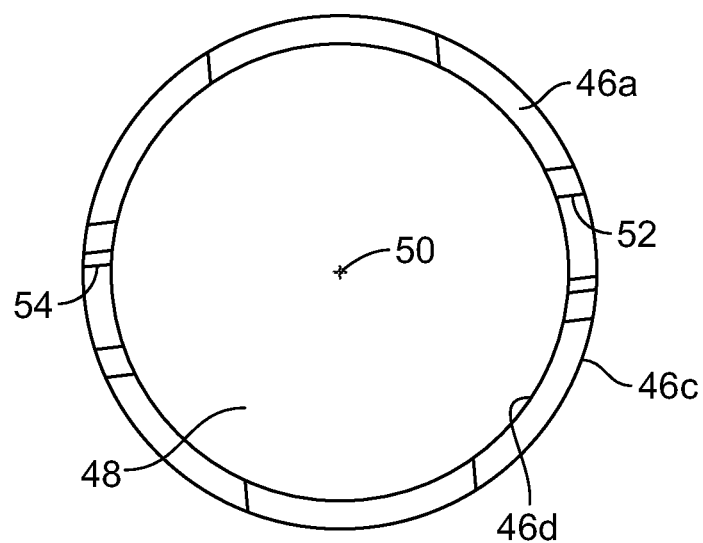
FIG. 9 is a front elevation view of the first member.

A vehicle accessory mounting device 20, see FIGS. 1 and 2, is configured to attach accessories 22, such as baskets, ski racks, bike racks, and the like, to a spare-tire hub assembly 24 of a vehicle 26, see FIGS. 4 and 5. The accessories 22 are used to carry cargo on the exterior of the vehicle 26. The vehicle accessory mounting device 20 can be quickly engaged with the spare-tire hub assembly 24 and quickly disengaged from the spare-tire hub assembly 24 with the use of one hand.

As shown in FIG. 4, in an embodiment, the spare-tire hub assembly 24 includes a vertical front wall 28, a side wall 30 which depends from the front wall 28, and a vertical rear wall 32 which seats against a vertical surface of the vehicle 26 and are attached thereto by suitable means, such as fasteners or welding. In an embodiment, the rear wall 32 seats against the back door of the vehicle 26. The front and side walls 28, 30 form a cavity 34. A plurality of studs 36 extend outwardly from the front wall 28. A passageway 38, which may be a central passageway, is provided through the front wall 28 and is in communication with the cavity 34.

As shown in FIG. 2, the vehicle accessory mounting device 20 includes a first member 40 which is attached to the spare-tire hub assembly 24 and extends into the cavity 34, a second member 42 which engages within the first member 40 and is movable relative to a longitudinal axis and is rotatable therein, and a locking assembly 44 attached to the second member 42. In an embodiment, the first and second members 40, 42 are cylindrical. In an embodiment, the first and second members 40, 42 are formed of tubes. The components 40, 42, 44 of the vehicle accessory mounting device 20 are preferably formed of metal so as to be robust.

Figure 10:
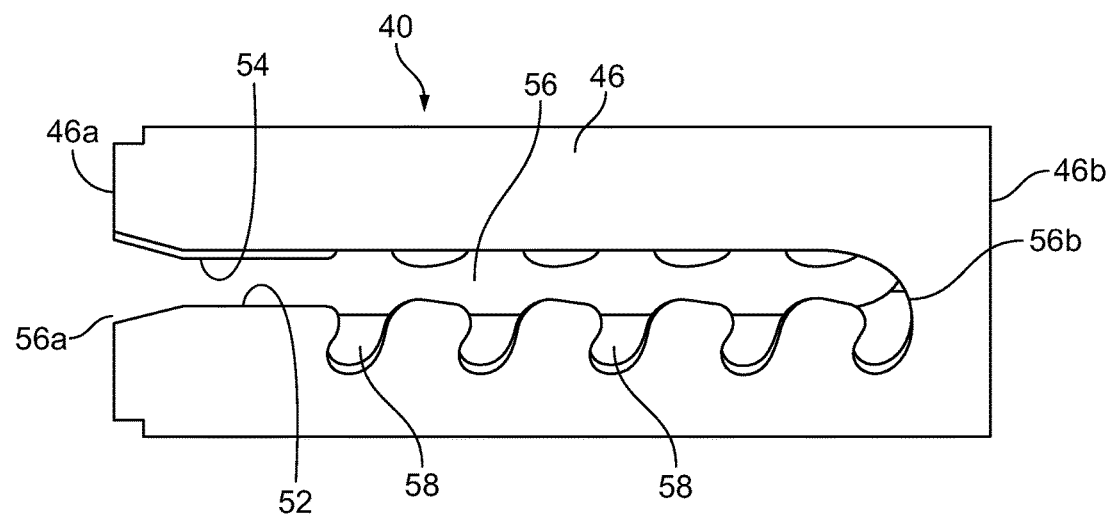
FIG. 10 is a side elevation view of the first member.
Figure 11:
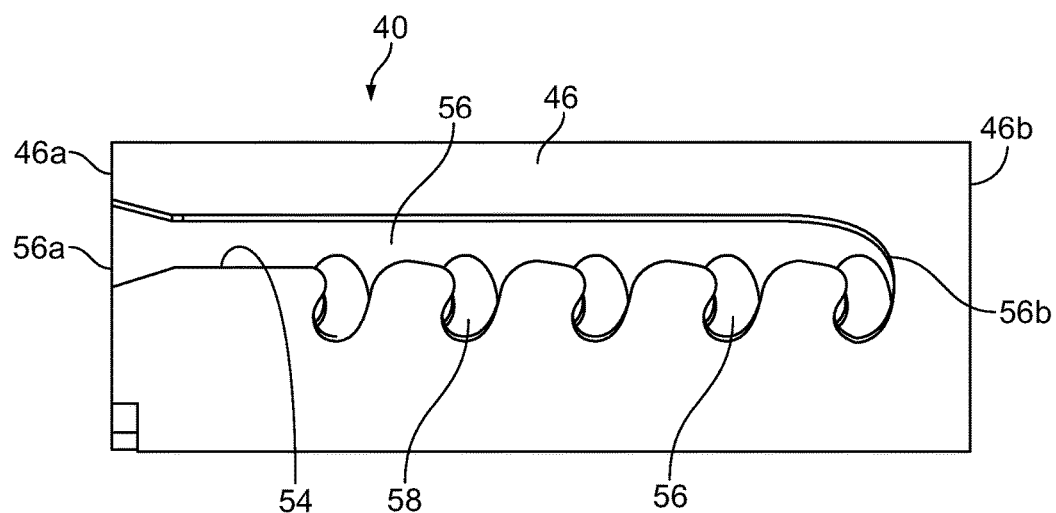
FIG. 11 is an alternate side elevation view of the first member with the first member rotated one hundred and eighty degrees around a longitudinal centerline.
Figure 12:
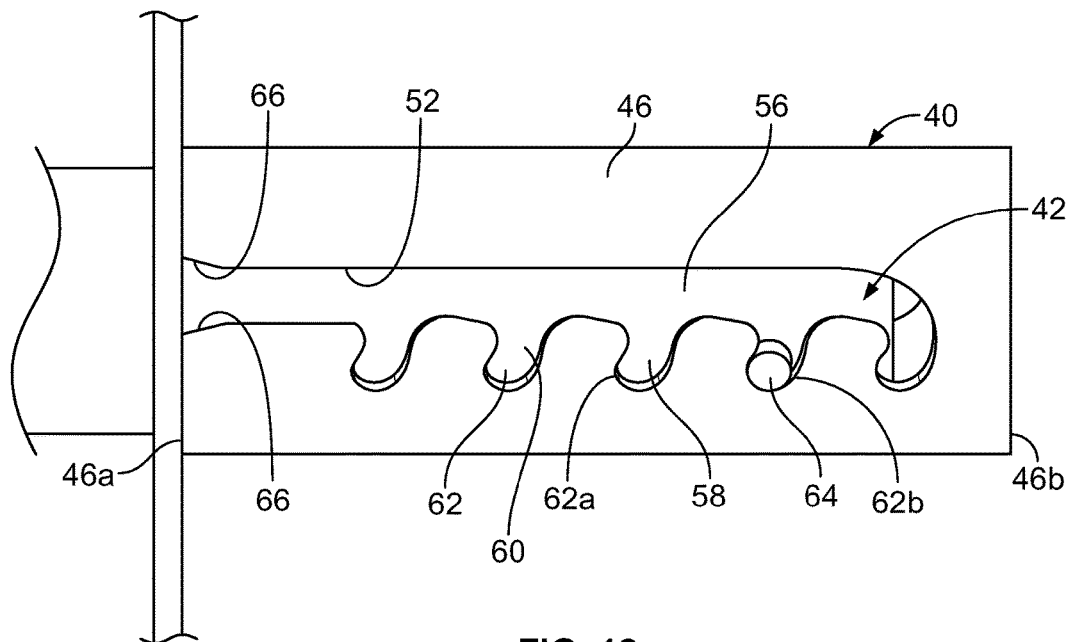
FIG. 12 is a partial side elevation view of the vehicle accessory mounting device.

As best shown in FIGS. 8-12, the first member 40 is formed of a cylindrical wall 46 having opposite front and rear ends 46a, 46b, an outer surface 46c and inner surface 46d, which defines a cylindrical passageway 48 extending from the front end 46a to the rear end 46b. In some embodiments, the passageway 48 is closed at the rear end 46b. A centerline 50 is defined along the longitudinal axis of the wall 46 from the front end 46a to the rear end 46b. Elongated first and second slots 52, 54 are provided through the wall 46 and extend from the inner surface 46d to the outer surface 46c such that the slots 52, 54 are in communication with the passageway 48. Each slot 52, 54 has a body 56 which has a front end 56a at the front end 46a of the wall 46 and a rear end 56b which is proximate to, but spaced from the rear end 46b of the wall 46, and a plurality of spaced apart fingers 58 which extend from the body 56. Each body 56 extends linearly and longitudinally along the wall 46, and each body 56 defines a longitudinal centerline which is parallel to the centerline 50. The bodies 56 of the slots 52, 54 are aligned with each other. The fingers 58 of the first slot 52 are angled relative to the longitudinal centerline of the body 56 and toward the front end 46a of the wall 46, and the fingers 58 of the second slot 54 are angled relative to the longitudinal centerline of the body 56 and toward the front end 46a of the wall 46. The fingers 58 of the first slot 52 extend in a direction which is opposite to the direction that the fingers 58 of the second slot 54 extend. When viewed in a plan view as shown in FIGS. 10 and 11, the fingers 58 of the first slot 52 extend downwardly and the fingers 58 of the second slot 54 extend upwardly. As best shown in FIG. 12, each finger 58 has a pin entrance portion 60 which extends at an angle relative to the longitudinal centerline of the body 56 and a pin capture portion 62 at the end of the pin entrance portion 60. The body 56, the pin entrance portion 60 and the pin capture portion 62 of each slot 52, 54 are sized to be slightly larger than a diameter of a pin 64 provided on the second member 42. In an embodiment, the pin capture portion 62 is sized to be approximately the same as the diameter of the pin 64. The pin capture portion 62 is closer to the front end 46a of the wall 46 than the pin entrance portion 60 such that the pin capture portion 62 is forward of the pin entrance portion 60. In an embodiment, each body 56 includes angled entrance surfaces 66 at the front end 56a to promote entry of the pin 64 into the respective slot 52, 54.

The first member 40 may be integrally formed with the front wall 28 of the spare-tire hub assembly 24 or may be attached to the front wall 28 of the spare-tire hub assembly 24. In an embodiment, the first member 40 is integrally formed with the front wall 28 by the front end 46a of the wall 46 being permanently attached to the front wall 28, for example by welding, and the wall 46 extending into the cavity 34. When a tire 68 of the vehicle 26 is attached to the studs 36 on the spare-tire hub assembly 24 in a known manner, the tire 68 abuts the front wall 28. In an embodiment, the first member 40 is attached to the spare-tire hub assembly 24 by a vertical plate 72 which extends outwardly from the front end 46a of the wall 46 of the first member 40. The vertical plate 72 includes a plurality of apertures 74 therethrough. The studs 36 of the spare-tire hub assembly 24 extend through the apertures 74, the plate 72 abuts against the front wall 28, and the wall 46 extends through the front wall 28 and into the cavity 34. When the tire 68 of the vehicle 26 is attached to the studs 36 of the spare-tire hub assembly 24 in a known manner, the plate 72 is positioned between the tire 68 and the front wall 28. The plate 72 is positioned between the tire 68 and the front wall 28 of the spare-tire hub assembly 24 for securement via a compressive force generated with the plurality of fasteners engaging with a corresponding one of the plurality of studs 36. A central passageway 76 of the tire 68 remains open.

Figure 13:
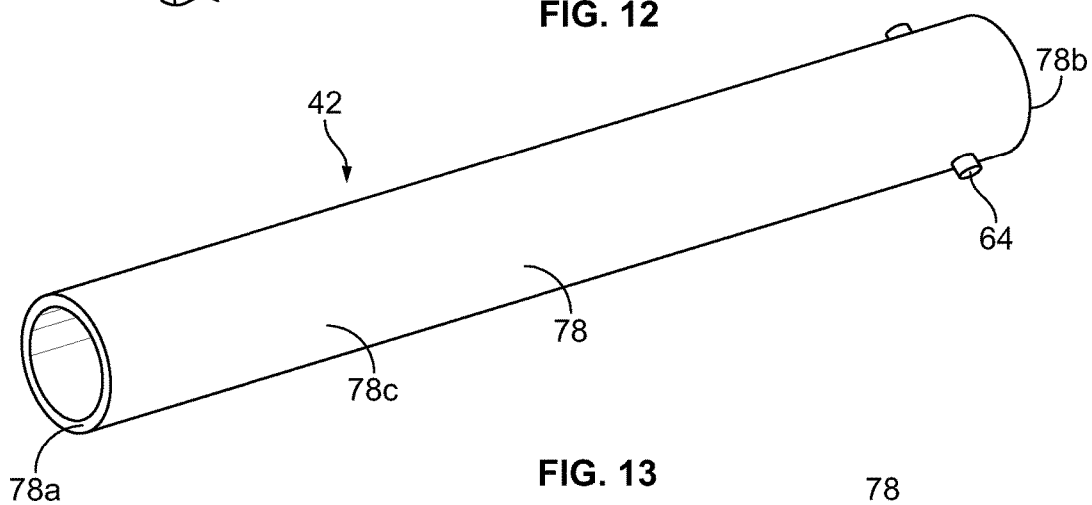
FIG. 13 is a perspective view of a second member of the vehicle accessory mounting device.
Figure 14:
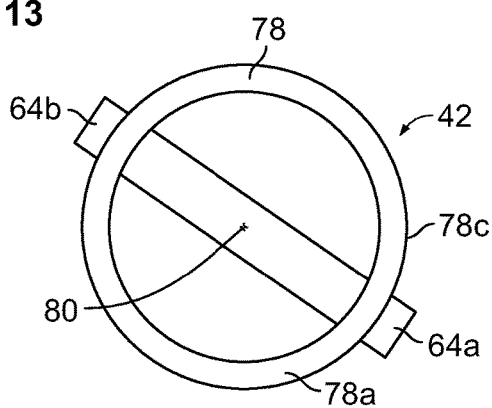
FIG. 14 is a front elevation view of the second member.

As best shown in FIGS. 13 and 14, the second member 42 is formed of a cylindrical wall 78 having opposite front and rear ends 78a, 78b and an outer surface 78c. A centerline 80 is formed along the longitudinal axis of the wall 78 from the front end 78a to the rear end 78b. In an embodiment, a cylindrical passageway extends from the front end 78a to the rear end 78b. Ends 64a, 64b of the pin 64 extend outwardly from the outer surface 78c. In an embodiment, the pins ends 64a, 64b are formed by a single pin which extends through the wall 78. In an embodiment, the pin ends 54a, 64b are formed from two separate pins. The pin ends 64a, 64b are aligned and define a centerline therethrough which is transverse to the centerline 80 of the wall 78. The pin ends 64a, 64b are provided proximate to, but spaced from, the rear end 78b of the wall 78.

The locking assembly 44 includes a cap 90 non-rotatably affixed to the front end 78a of the wall 78 of the second member 42, a handle 92 pivotally attached to the cap 90, and a linkage mechanism 94 within the handle 92 and which is configured to be engaged with the cap 90. The linkage mechanism 94 normally prevents pivoting of the handle 92 relative to the cap 90, but the linkage mechanism 94 can be activated to allow the handle 92 to be pivoted relative to the cap 90.

Figure 15:
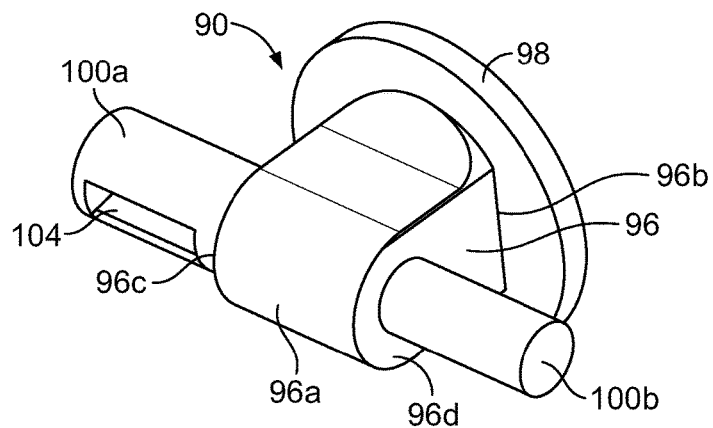
FIG. 15 is a perspective view of a cap of the vehicle accessory mounting device.
Figure 16:
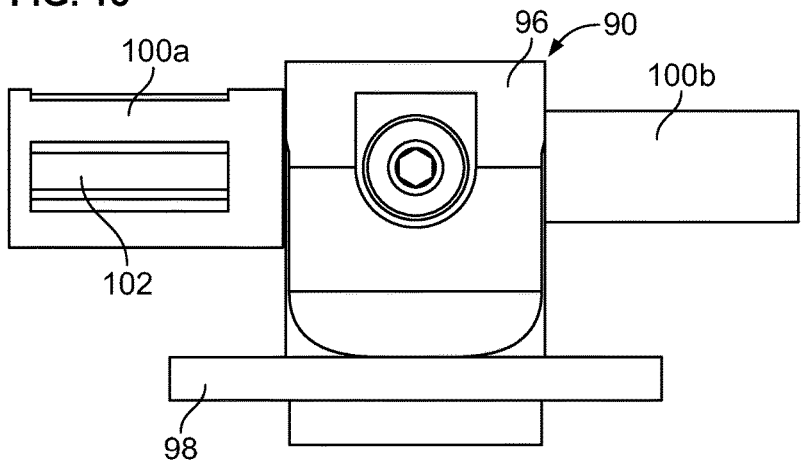
FIG. 16 is a bottom plan view of the cap.
Figure 17:
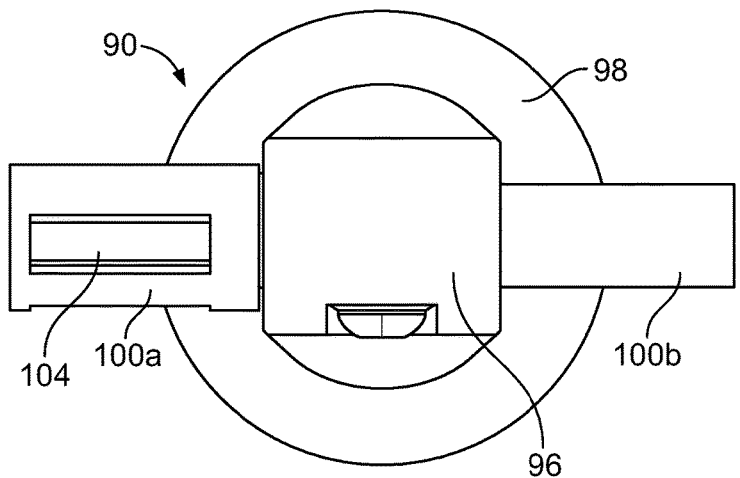
FIG. 17 is a front elevation view of the cap.

As shown in FIGS. 15-17, the cap 90 includes a base 96 having a flange 98 extending outwardly from a rear end 96b of the base 96, a first pin end 100a extending outwardly from a first side 96c of the base 96 and proximate to a front end 96a of the base 96, and a second pin end 100b extending outwardly from a second side 96d of the base 96 and proximate to the front end 96a thereof.

The pin ends 100a, 100b cannot rotate relative to the base 96 and are axially aligned with each other. In an embodiment, the pin ends 100a, 100b are integrally formed with the base 96. In an embodiment, the pin ends 100a, 100b are formed as separate pins and are non-rotatably affixed to the base 96 by suitable means, such as fasteners or welding. In an embodiment, the pin ends 100a, 100b are formed by a single pin which extends through a passageway in the base 96 and non-rotatably affixed thereto by suitable means, such as a fastener or welding. Pin end 100a has first and second elongated recesses 102, 104 formed therein. The recesses 102, 104 are perpendicular to each other. When the locking assembly 44 is assembled, the first recess 102 commences at a bottom of the pin end 100a and extends vertically upwardly therefrom, and the second recess 104 commences at a front of the pin end 100a and extends rearwardly; therefore, the first recess 102 extends in a vertical direction and the second recess 104 extends in a horizontal direction.

Figure 3:
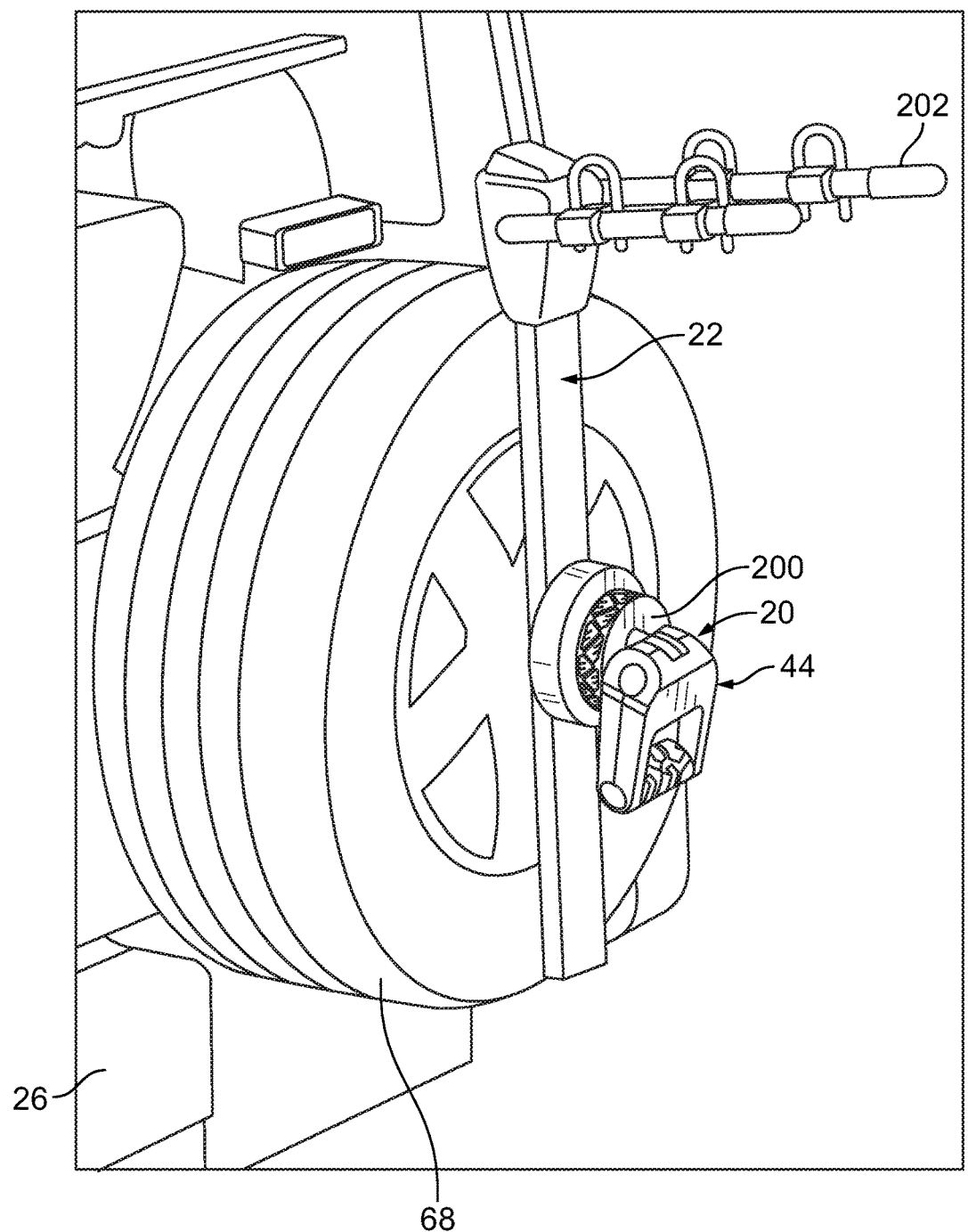
FIGS. 3 and 4 are perspective views of the vehicle accessory mounting device mounted on a vehicle with accessories.
Figure 18:
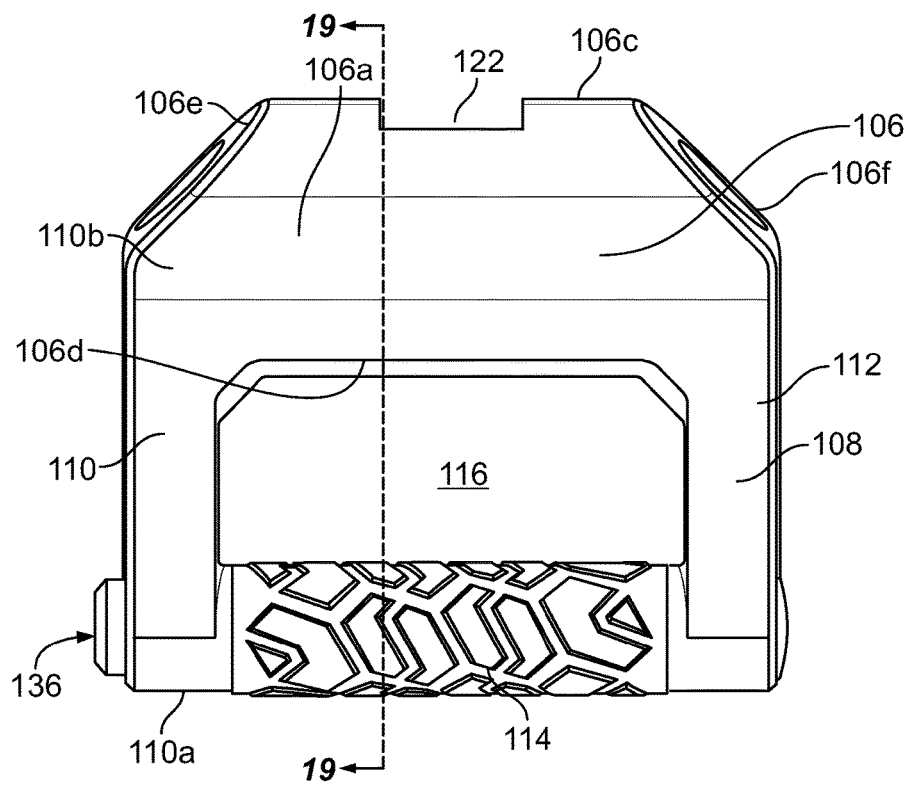
FIG. 18 is a front elevation view of a handle of the vehicle accessory mounting device.
Figure 19:
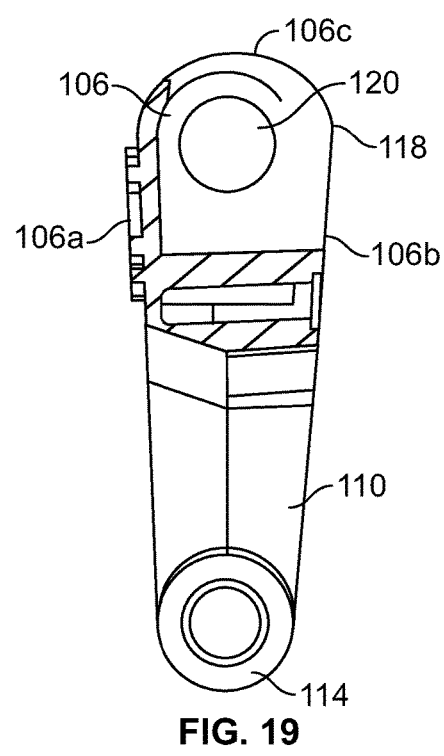
FIG. 19 is a cross-sectional view of the handle along line 19-19 of FIG. 18.

The handle 92 is attached to the pin ends 100a, 100b and is rotatable relative to the pin ends 100a, 100b and the cap 90 when the linkage mechanism 94 is activated. As shown in FIGS. 18 and 19, the handle 92 includes a mount portion 106 which is used to mount the handle 92 onto the cap 90, and a grip portion 108 which the user can grasp to manipulate the handle 92. The grip portion 108 includes leg sections 110, 112 which extend from the mount portion 106, and a grip section 114 extending between the leg sections 110, 112. An opening 116 is defined by the mount portion 106 and the sections 110, 112, 114 through which a user can insert his/her hand to manipulate the handle 92 as described herein. The grip section 114 may have a rubber coating thereon to facilitate gripping of the grip section 114 by the user. The components of the handle 92 are described with regard to the handle 92 being positioned vertically as shown in FIGS. 3 and 4 when mounted to the vehicle 26 (such that the grip section 114 is vertically downwardly of the mount portion 106) for ease in description.

The mount portion 106 has a front surface 106a, a rear surface 106b, upper and lower surfaces 106c, 106d connecting the front and rear surfaces 106a, 106b, and side surfaces 106e, 106f. In an embodiment, the front and rear surfaces 106a, 106b are planar. The upper surface 106c is curved such that the upper surface 106c generally falls on line formed by an imaginary circle. A locking protrusion 118, see FIG. 19, is provided between the rear surface 106b and the upper surface 106c and extends outwardly therefrom. A central passageway 120 extends between the side surfaces 106e, 106f. A pocket 122 is provided in the rear and upper surfaces 106b, 106c and intersects the passageway 120, such that the pocket 122 divides the passageway 120 into a first passageway section 120a and a second passageway section 120b, see FIG. 20. The base 96 of the cap 90 seats within the pocket 122, the first pin end 100a seats within the first passageway section 120a, and the second pin end 100b seats within the second passageway section 120b.

Figure 20:
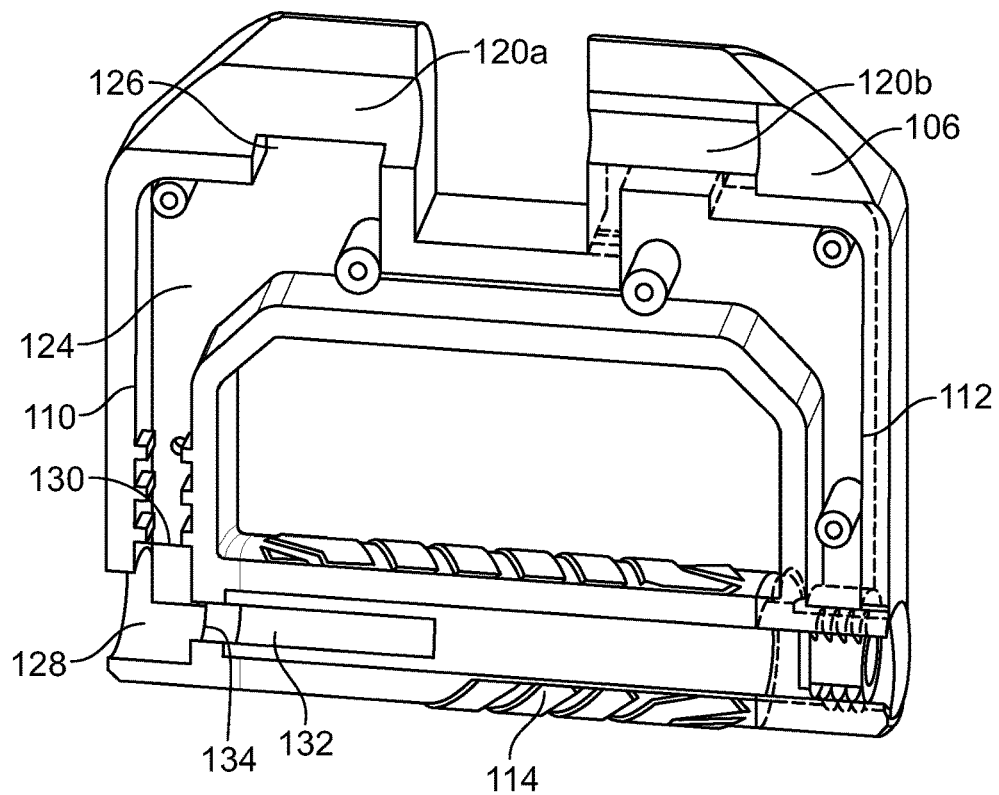
FIG. 20 is a perspective view of a portion of the handle and shown in cross-section.
Figure 21:
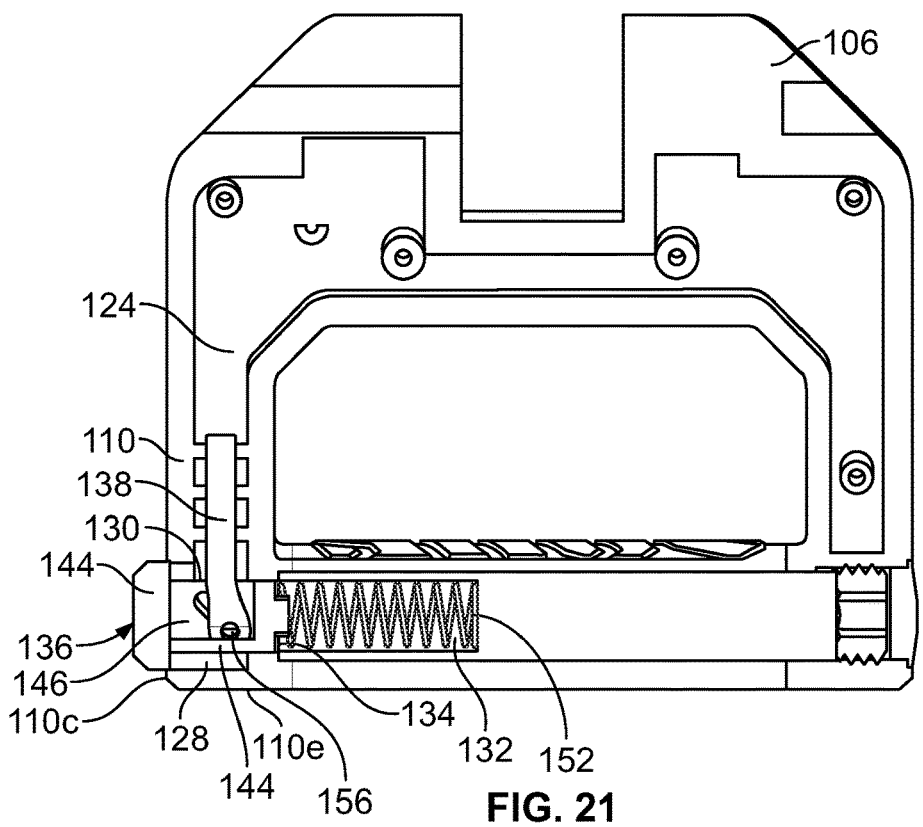
FIG. 21 is a front elevation view of a portion of the handle and shown in cross-section.

As shown in FIG. 20, leg section 110 has a cavity 124 therein which is in communication with the first passageway section 120a at opening 126, and further has a passageway 128 extending between side surfaces 110c, 110d of the leg section 110 and proximate to a bottom surface 110e, and which is in communication with the lower end of the cavity 124 at opening 130. The passageway 128 has open ends at the sides 110c, 110d.

The grip section 114 may be cylindrical. As shown in FIG. 20, a recess 132 is provided in the grip section 114 and extends from the side which is engaged with the leg section 110. The recess 132 is in communication with the passageway 128 in the leg section 110 at opening 134.

The linkage mechanism 94 is partially mounted within the cavity 124 and the passageway 128 of the leg section 110 and is configured to seat within the recesses 102, 104 in the pin end 100a and configured to seat within the recess 132 in the grip section 114. The linkage mechanism 94 includes a depressible spring-loaded button 136, see FIGS. 21 and 24-26, mounted within the passageway 128 which extends outwardly from the leg section 110, a first or lower link member 138 mounted within the cavity 124 and movably attached to the button 136, see FIGS. 22, 23 and 27, and a second or upper link member 140 mounted within the cavity 124 and pivotally attached to the lower link member 138 and to the leg section 110, see FIGS. 22, 23 and 28.

As shown in FIGS. 21 and 24-26, the button 136 has a body 142 having a finger engagement portion 144 at an end thereof. The finger engagement portion 144 may be larger than the body 142. When the handle 92 is positioned vertically, a vertical passageway 146, see FIG. 26, is provided through the body 142, a front slot 148 is provided in a front surface and is communication with the passageway 146, and a rear slot 150 is provided in a rear surface and is communication with the passageway 146. Each slot 148, 150 angles outwardly from the grip portion 114 as the slot 148, 150 extends from its bottom end 148a, 150a to its top end 148b, 150b.

The body 142 of the button 136 seats within the passageway 128 through the leg section 110 and the finger engagement portion 144 extends outwardly of the leg section 110. A spring 152 is provided between the end of the body 142 and the end of the recess 132. The button 136 can be depressed such that the finger engagement portion 144 moves closer to the side of the leg section 110 and the body 142 translates along the passageway 128, thereby compressing the spring 152. The body 142 partially enters into the recess 132 when the button 136 is depressed.

Figure 22:
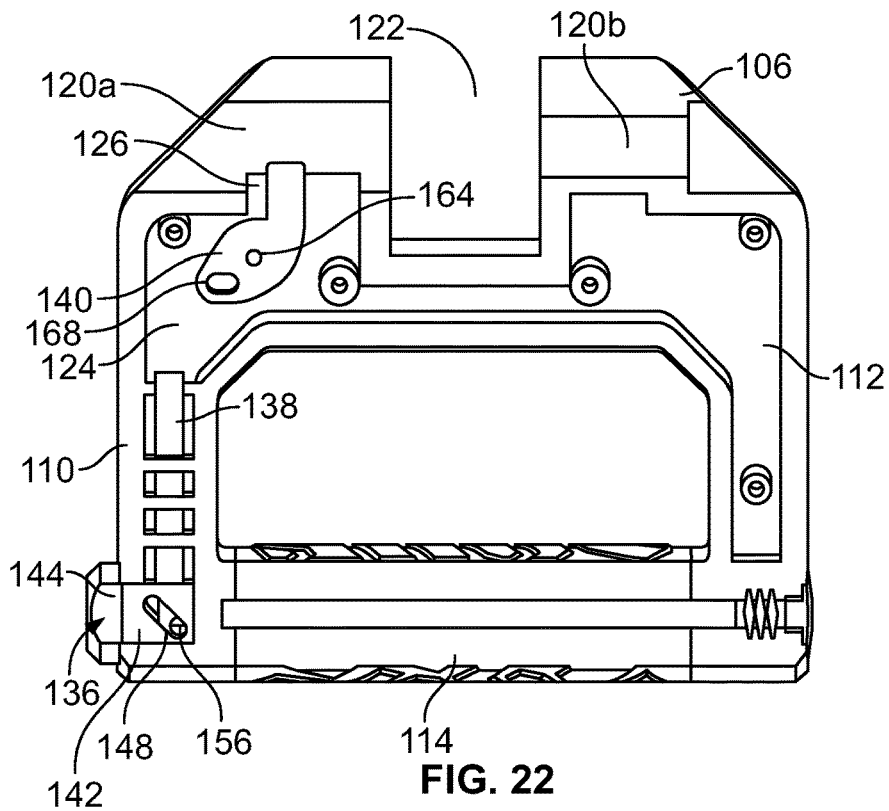
FIG. 22 is an alternate front elevation view of a portion of the handle and shown in cross-section.
Figure 23:
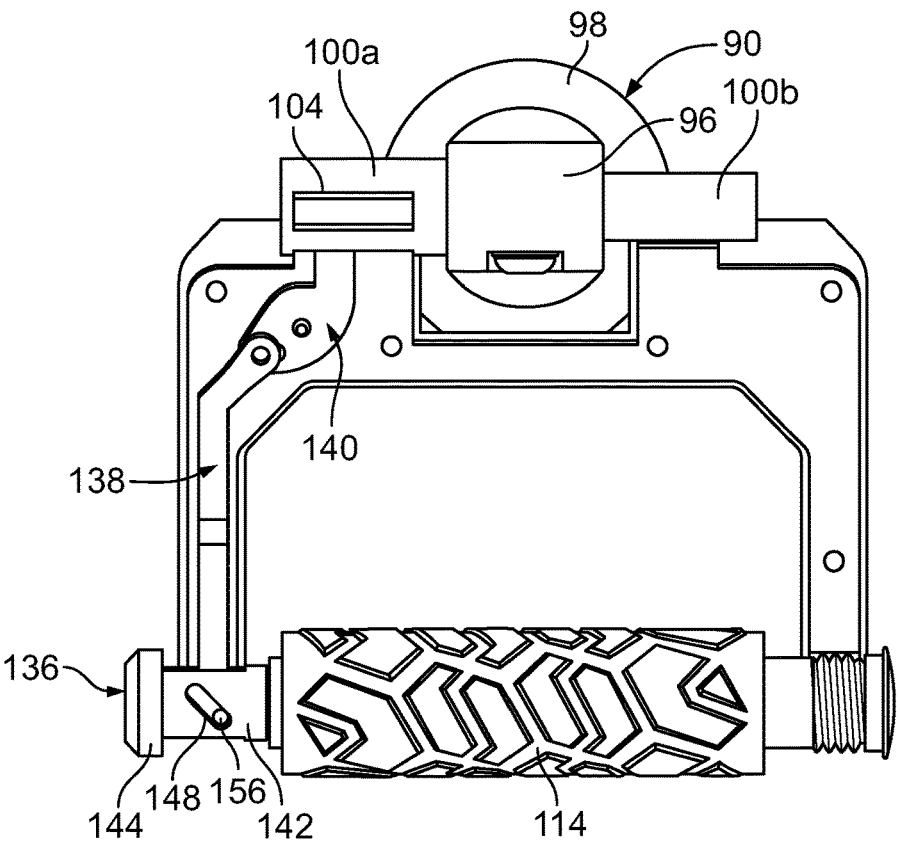
FIG. 23 is a front elevation view of a portion of the handle and shown with part of the handle removed for clarity.

As shown in FIGS. 22, 23 and 27, the lower link member 138 is formed from an elongated body 154 having lower and upper ends 154a, 154b and a pin 156 extending outwardly from the body 154 proximate to the lower end 154a. An aperture 158 is provided through the upper end 154b of the body 154. The lower portion of the body 154 seats within the passageway 146 and ends of the pin 156 seats within the slots 148, 150. The body 154 extends upwardly through the open upper end of the passageway 146 and along the cavity 124 in the leg section 110 such that the upper end 154b is proximate to, but spaced from, the opening 126.

As shown in FIGS. 22, 23 and 28, the upper link member 140 is formed from a body 160 having a finger 162 extending vertically upwardly from an upper end thereof. The upper link member 140 is pivotally attached to the leg section 110 by a pivot pin 164 that extends through an aperture 166 in the body 160. In an embodiment, the aperture 166 is centered in the body 160. The finger 162 is offset from the aperture 166. A horizontal elongated slot 168 is provided through the body 160 proximate to a lower end thereof. The slot 168 is positioned on an opposite side of a vertical axis which extends through the aperture 166 from where the finger 162 extends, and is positioned on an opposite side of a horizontal axis which extends through the aperture 166 from where the finger 162 extends. The upper link member 140 is pivotally attached to the lower link member 138 by a pivot pin 170 which extends through the aperture 158 in the lower link member 138 and through the aperture 166 in the upper link member 140.

When the locking assembly 44 is not activated, that is the button 136 is not depressed, the finger engagement portion 144 is positioned at its most outboard portion from the leg section 110, the spring 152 is expanded, the pin 156 seats within the lower ends 148a, 150a of the slots 148, 150, and the finger 162 of the upper link member 140 is seated within one of the recesses 102, 104 (depending on whether the handle 92 is vertical or horizontal) of the cap 90. This prevents a user from rotating the handle 92 relative to the cap 90.

In embodiments as shown in FIGS. 3-6, the accessory 22 has a plate 200 and a mounting assembly 202 upon which the cargo can be carried. An opening 204 is provided through the plate 200. The mounting assembly 202 can take a variety of forms such that a variety of cargo can be carried.

During the initial mounting of the accessory 22, the vehicle accessory mounting device 20 is oriented such that the handle 92 is positioned horizontally (although the handle 92 of the vehicle accessory mounting device 20 can be positioned vertically, but the handle 92 will need to be moved to the horizontal position to perform the locking operation). To move the handle 92 from the vertical position to the horizontal position, the locking assembly 44 is activated by a user depressing the finger engagement portion 144 of the button 136 into the leg section 110. When the button 136 is depressed, the finger engagement portion 144 moves toward the leg section 110, and the body 142 translates along the passageway 128 which compresses the spring 152. As the body 142 translates, the pin 156 translates along the length of the slots 148, 150 until the pin 156 contacts the top ends 148b, 150b, which causes the lower link member 138 to translate toward an upper end 110b of the leg section 110. The pin 170 in the lower link member 138 slides along the slot 168 until the pin 170 contacts an end of the slot 168. At that point, continued vertical movement of the lower link member 138 causes the upper link member 140 to rotate around the pin 164, thereby causing the finger 162 of the upper link member 140 to rotate out of the recess 102. Once the finger 162 is out of the recess 102, the handle 92 is rotated relative to the cap 90 by the user to a horizontal position.

Once the handle 92 is rotated to the horizontal position, the finger 162 of the upper link member 140 aligns with the slot 104 in the cap 90. The finger engagement portion 144 of the button 136 is released which causes the spring 152 to resume its expanded condition, thereby causing the body 142 to translate along the passageway 128 and move the finger engagement portion 144 outwardly from the leg section 110. As the body 142 translates, the pin 156 translates along the length of the slots 148, 150 until the pin 156 contacts the lower ends 148a, 150a, which causes the lower link member 138 to translate toward a bottom end 110a of the leg section 110. As the lower link member 138 translates, the upper link member 140 is caused to rotate in the opposite direction around the pin 164 which causes the finger 162 of the upper link member 140 to rotate into the slot 104 in the cap 90. Once the finger 162 of the upper link member 140 is in the slot 104, the handle 92 is in a horizontal position and cannot be rotated relative to the cap 90 by the user.

The user mounts a tire 68 onto the spare-tire hub assembly 24 as described herein. Thereafter, the accessory 22 is mounted onto the second member 42 by sliding the second member 42 through the opening 204 in the plate 200. Next, the rear end 78b of the second member 42 is inserted through the central passageway 76 in the tire 68, and through the front end 46a of the first member 40. Alternatively, the accessory 22 can be held in place in front of the central passageway 76 in the tire 68 and the second member 42 is inserted through the opening 204 in the plate 200, through the central passageway 76 in the tire 68, and through the front end 46a of the first member 40. The centerlines 50, 80 align with each other. As the user continues to push the second member 42 into the first member 40, the pin ends 64a, 64b slide longitudinally along the bodies 56 of the slots 52, 54 until the flange 98 of the cap 90 contacts the plate 200 of the accessory 22. At this position, the pin ends 64a, 64b align with one of the pin entrance portions 60 in each slot 52, 54. The handle 92 is then rotated around the centerlines 50, 80, which causes the attached cap 90 and second member 42 to rotate. This causes the pin ends 64a, 64b to move into the pin entrance portions 60 in each slot 52, 54 and slide along the angled walls of the pin entrance portions 60 until the pin ends 64a, 6b come to rest within the pin capture portions 62.

Thereafter, the locking assembly 44 is activated by a user depressing the finger engagement portion 144 of the button 136 into the handle 92 so that the handle 92 can be moved from the horizontal position to the vertical position to lock the handle 92 in position. When the button 136 is depressed, the finger engagement portion 144 moves toward the leg section 110, and the body 142 translates along the passageway 128 which compresses the spring 152. As the body 142 translates, the pin 156 translates along the length of the slots 148, 150 until the pin 156 contacts the bottom ends 148a, 150a, which causes the lower link member 138 to translate toward the bottom end 110a of the leg section 110. As the lower link member 138 translates, the upper link member 140 is caused to rotate around the pin 164 which causes the finger 162 of the upper link member 140 to rotate out of the slot 104 in the cap 90. Once the finger 162 of the upper link member 140 is out of the slot 104, the handle 92 is rotated relative to the cap 90 by the user to the vertical position.

When the handle 92 is moved from the horizontal position to the vertical position, the locking protrusion 118 on the handle 92 engages against the plate 200 of the accessory 22. This engagement causes the handle 92, the cap 90, the second member 42 and the pin ends 64a, 64b to move forwardly relative to the first member 40, such that the pin ends 64a, 64b move toward the front end 46a of the first member 40 within the pin capture portions 62 until the pin ends 64a, 64b engage front ends 62a of the pin capture portions 62. This locks the vehicle accessory mounting device 20, such that the accessory 22 is locked to the spare-tire hub assembly 24 of the vehicle 26.

To remove the accessory 22, the second member 42 must be removed from the first member 40. To effect this, the handle 22 is rotated from the vertical position to the horizontal position by activating the locking assembly 44 as described herein. When the handle 22 is rotated from the vertical position to the horizontal position, the locking protrusion 118 on the handle 92 disengages from against the plate 200 of the accessory 22 during this rotation. When the locking protrusion 118 disengages from against the plate 200, the pin ends 64a, 64b are free to move toward the rear end 46b of the first member 40 within the pin capture portions 62 until the pin ends 64a, 64b engage rear ends 62b of the pin capture portions 62. The handle 92 is then rotated around the centerlines 50, 80, which causes the attached cap 90 and second member 42 to rotate. This causes the pin ends 64a, 64b to move into the pin entrance portions 60 in each slot 52, 54 and slide along the angled walls of the pin entrance portions 60 until the pin ends 64a, 6b come to rest within the bodies 56 of the slots 52, 54. The handle 92, the cap 9 and the second member 42 are then pulled out of the first member 40. As the handle 92, the cap 9 and the second member 42 are pulled out of the first member 40, the pin ends 64a, 64b slide longitudinally along the bodies 56 toward the front ends 46a of the first member 40 until the second member 42 is released from the first member 40. Once the second member 42 passes through the opening 204 in the plate 200 of the accessory 22, the accessory 22 is free to be removed. Thereafter, another accessory can be mounted onto the vehicle 26 in the same manner as described herein.

The vehicle accessory mounting device 20 and the accessory can be quickly and easily locked to and removed from the spare-tire hub assembly 24 with one hand.

Figure 29:
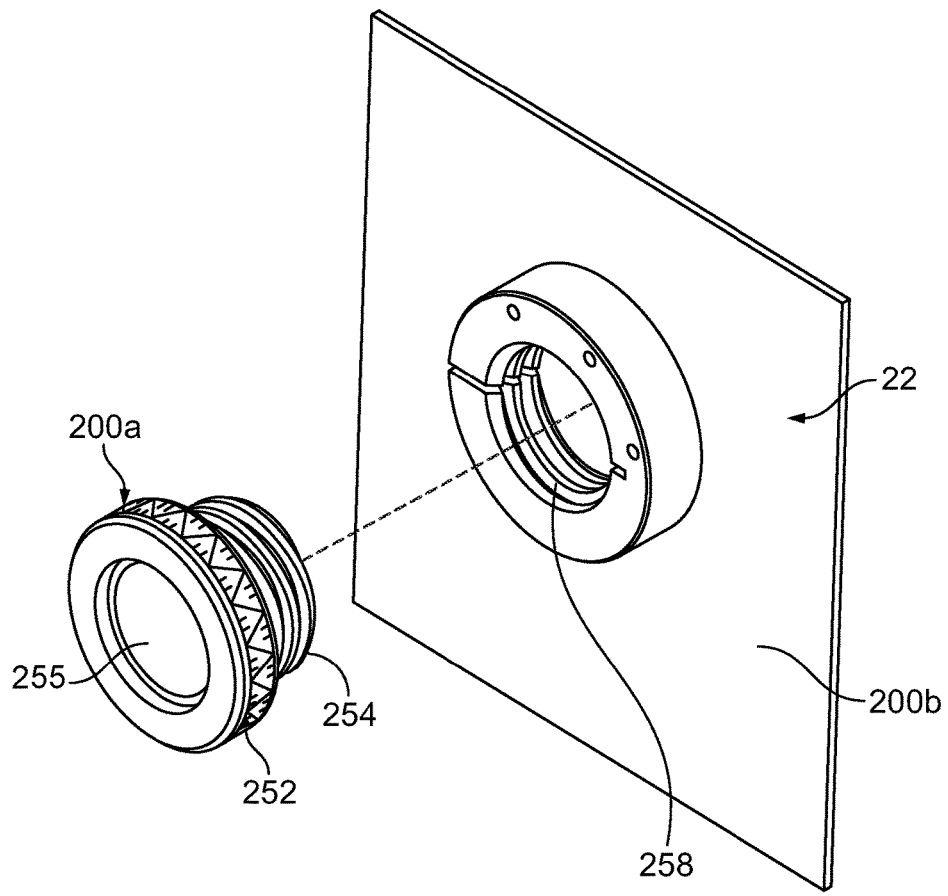
FIG. 29 is an exploded perspective view of a fine adjustment spacing assembly which can be used with the vehicle accessory mounting device.
Figure 30:
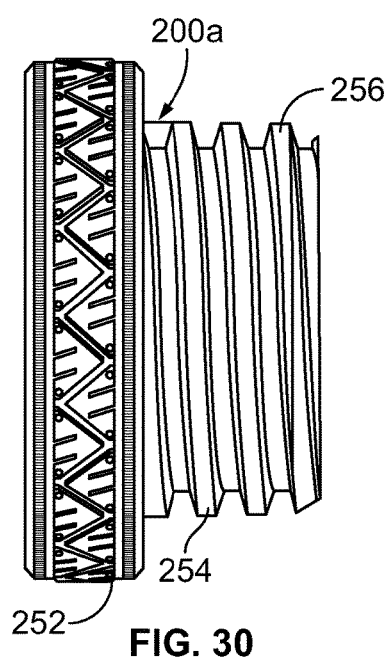
FIG. 30 is a side elevation view of a plate used to form the fine adjustment spacing assembly.
Figure 31:
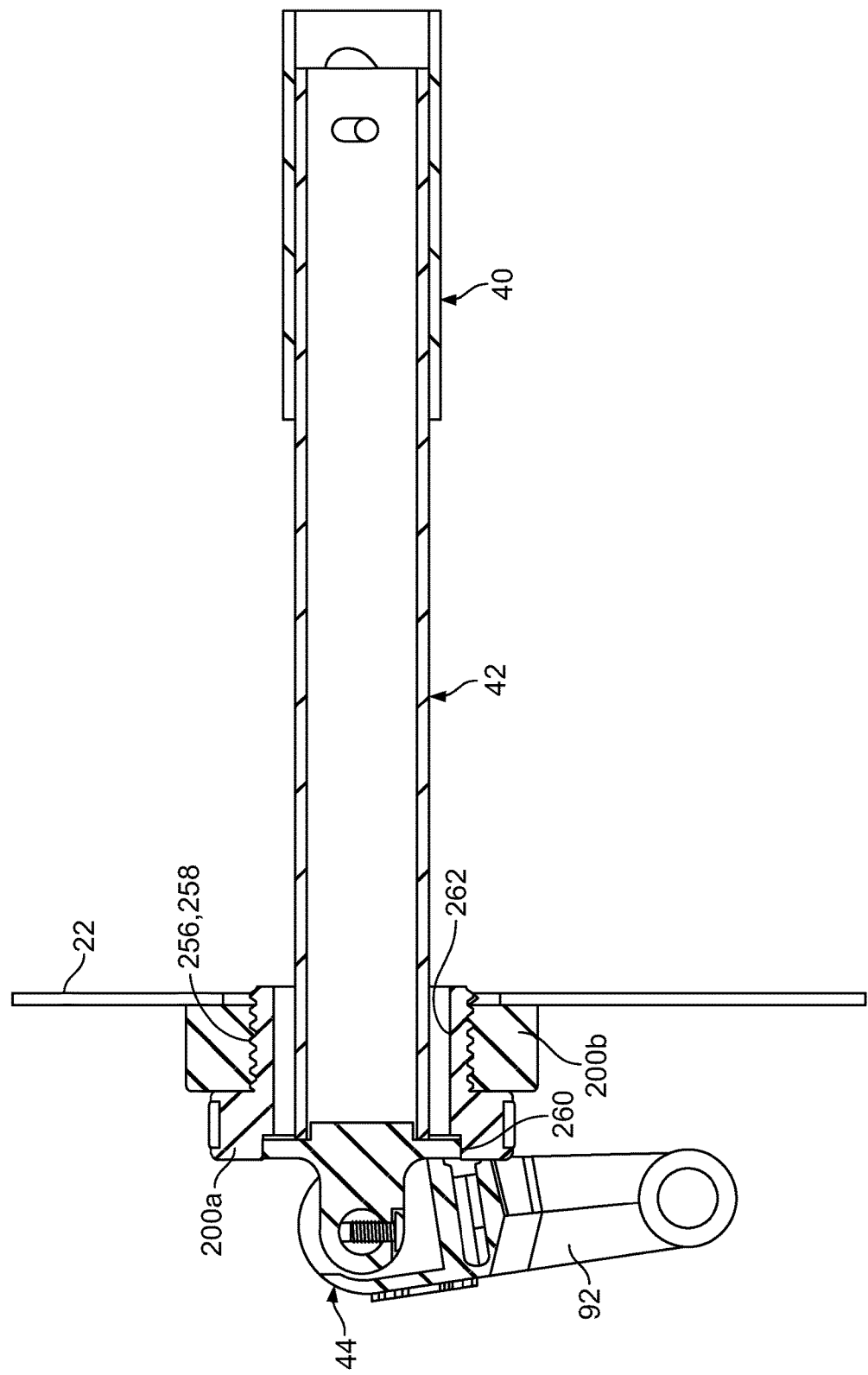
FIG. 31 is a cross-sectional view of the vehicle accessory mounting device and accessory, when used with the fine adjustment spacing assembly.

In an embodiment, the vehicle accessory mounting device 20 further includes a fine adjustment spacing assembly 250, see FIGS. 29-31. The components of the fine adjustment spacing assembly 250 are preferably formed of metal so as to be robust.

To form the fine adjustment spacing assembly 250, the plate 200 of the first embodiment is separated into first and second plates 200*a*, 200*b* which are threadedly connected together by a mating thread form.

The plate 200 includes a hand grip portion 252 and an accessory mating portion 254 extending therefrom. A central passageway 255 extends through the portions 252, 254. A thread form 256 is provided on the exterior surface of the accessory mating portion 254 and mates with a thread form 258 on the accessory 22. The passageway 255 has an outer portion 260 which is sized to accommodate the flange 98 of the cap 90 and an inner portion 262 which is sized to accommodate the second member 42 and the pin ends 64*a*, 64*b*.

In use, the user mounts a tire 68 onto the spare-tire hub assembly 24 as described herein. During the initial mounting of the accessory 22 using the fine adjustment spacing assembly 250, the vehicle accessory mounting device 20 is oriented such that the handle 92 is positioned horizontally as described herein.

Thereafter, the accessory 22 is mounted onto the second member 42 by sliding the second member 42 through the opening 204 in the plate 200. Next, the rear end 78*b* of the second member 42 is inserted through the central passageway 76 in the tire 68, and through the front end 46*a* of the first member 40. Alternatively, the accessory 22 can be held in place in front of the central passageway 76 in the tire 68 and the second member 42 is inserted through the opening 204 in the plate 200, through the central passageway 76 in the tire 68, and through the front end 46*a* of the first member 40. The centerlines 50, 80 align with each other. As the user continues to push the second member 42 into the first member 40, the pin ends 64*a*, 64*b* slide longitudinally along the bodies 56 of the slots 52, 54 until the flange 98 of the cap 90 contacts the plate 200 of the accessory 22. At this position, the pin ends 64*a*, 64*b* align with one of the pin entrance portions 60 in each slot 52, 54. The handle 92 is then rotated around the centerlines 50, 80, which causes the attached cap 90 and second member 42 to rotate. This causes the pin ends 64*a*, 64*b* to move into the pin entrance portions 60 in each slot 52, 54 and slide along the angled walls of the pin entrance portions 60 until the pin ends 64*a*, 6*b* come to rest within the pin capture portions 62.

Thereafter, the locking assembly 44 is activated by a user depressing the finger engagement portion 144 of the button 136 into the handle 92 so that the handle 92 can be moved from the horizontal position to the vertical position to lock the handle 92 in position. When the button 136 is depressed, the finger engagement portion 144 moves toward the leg section 110, and the body 142 translates along the passageway 128 which compresses the spring 152. As the body 142 translates, the pin 156 translates along the length of the slots 148, 150 until the pin 156 contacts the bottom ends 148*a*, 150*a*, which causes the lower link member 138 to translate toward the bottom end 110*a* of the leg section 110. As the lower link member 138 translates, the upper link member 140 is caused to rotate around the pin 164 which causes the finger 162 of the upper link member 140 to rotate out of the slot 104 in the cap 90. Once the finger 162 of the upper link member 140 is out of the slot 104, the handle 92 is rotated relative to the cap 90 by the user to the vertical position.

When the handle 92 is moved from the horizontal position to the vertical position, the locking protrusion 118 on the handle 92 should engage against the plate 200 of the accessory 22 as described herein to lock the vehicle accessory mounting device 20. The user should feel resistance when the handle 92 is moved from the horizontal position to the vertical position, but not so much resistance that the handle 92 cannot be moved. If the handle 92 was moved to the vertical position without resistance or with too little resistance, this is an indication that the locking protrusion 118 on the handle 92 did not engage completely against the plate 200. The plate 200 is rotated via the mating threads 256, 258 to move the plate 200 toward the handle 92 and outwardly from the accessory 22, until the plate 200 engages with the locking protrusion 118 on the handle 92. This decreases the distance between the locking protrusion 118 and the plate 200. The handle 92 is then rotated to ensure that the handle 92 can be rotated from the vertical position to the horizontal position and then returned to the vertical position. The plate 200 can be further rotated via the mating threads 256, 258 to ensure that the proper amount of resistance is provided. If the user feels too much resistance, the plate 200 is rotated via the mating threads 256, 258 to move the plate 200 toward the accessory 22. This provides additional room for the locking protrusion 118 between the handle 92 and the plate 200.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A vehicle accessory mounting device configured to attach accessories to a spare-tire hub assembly of a vehicle comprising:
    a first member formed by a wall having a front end, a rear end, a passageway, and first and second slots through the wall, each slot having an elongated body which extends longitudinally along a longitudinal axis of the wall and a plurality of fingers extending from the body;
    a second member formed by a wall having a front end and a rear end, and a pair of pin ends extending outwardly from the wall of the second member; and
    a handle attached to the second member, the handle being pivotable relative to the second member, the handle comprising a mount portion, a grip portion extending from the mount portion, and a locking protrusion extending outwardly from the mount portion,
    wherein when the handle is in a vertical position, the locking protrusion is in a first position and when the handle is in a horizontal position, the locking protrusion is in a second position; and wherein the second member is movable into and out of the first member such that the pin ends slide along the slots, and the second member and handle are rotatable relative to the first member.

2. The vehicle accessory mounting device of claim 1, wherein the fingers of the first slot extend in a first direction and the fingers of the second slot extend in a second, opposite direction.

3. The vehicle accessory mounting device of claim 2, wherein the fingers of the slots are angled relative to a longitudinal axis of the first member.

4. The vehicle accessory mounting device of claim 1, wherein the bodies of each slot are aligned with each other.

5. The vehicle accessory mounting device of claim 1, wherein the fingers of the slots are angled relative to a longitudinal axis of the first member.

6. The vehicle accessory mounting device of claim 1, further comprising a locking assembly configured to lock the handle into the vertical position and configured to lock the handle into the horizontal position.

7. The vehicle accessory mounting device of claim 6, wherein the locking assembly comprises a cap attached to the second member and to the handle, the handle being rotatable around the cap, a spring loaded movable button mounted within the handle, a first link member attached to the button and mounted within the handle, and a second link member attached to the first link member and mounted within the handle, the first link member including a finger which is engageable with the cap.

8. The vehicle accessory mounting device of claim 7, wherein the cap includes a first slot into which the finger is configured to engage when the handle is in the vertical position, and a second slot into which the finger is configured to engage when the handle is in the horizontal position.

9. The vehicle accessory mounting device of claim 1, further comprising a cap attached to the second member and to the handle, the handle being rotatable around the cap.

10. The vehicle accessory mounting device of claim 9, further comprising a plate configured to engage the cap, the plate having a thread form on an exterior surface thereof.

11. The vehicle accessory mounting device of claim 1, wherein the grip portion forms a pocket into which a user's hand can be inserted.

12. In combination, a vehicle accessory mounting device and an accessory, comprising:
the accessory comprising first and second plates which are threadedly attached to each other; and
the vehicle accessory mounting device comprising
a first member formed by a wall having a front end, a rear end, a passageway, and first and second slots through the wall, each slot having an elongated body which extends longitudinally along a longitudinal axis of the wall and a plurality of fingers extending from the body,
a second member formed by a wall having a front end and a rear end, and a pair of pin ends extending outwardly from the wall of the second member, and
a handle attached to the second member, the handle being pivotable relative to the second member, the handle comprising a mount portion, a grip portion extending from the mount portion, and a locking protrusion extending outwardly from the mount portion, the second member being movable into and out of the first member such that the pin ends slide along the slots, and the second member and handle being rotatable relative to the first member;
wherein when the handle is in a vertical position, the locking protrusion is engaged against the first plate, and when the handle is in a horizontal position, the locking protrusion is disengaged from the first plate.

13. The combination of claim 12, wherein the fingers of the first slot extend in a first direction and the fingers of the second slot extend in a second, opposite direction.

14. The combination of claim 13, wherein the fingers of the slots are angled relative to a longitudinal axis of the first member.

15. The combination of claim 12, wherein the bodies of each slot are aligned with each other.

16. The combination of claim 12, wherein the fingers of the slots are angled relative to a longitudinal axis of the first member.

17. The combination of claim 12, further comprising a locking assembly configured to lock the handle into the vertical position and configured to lock the handle into the horizontal position.

18. The combination of claim 17, wherein the locking assembly comprises a cap attached to the second member and to the handle, the handle being rotatable around the cap, a spring loaded movable button mounted within the handle, a first link member attached to the button and mounted within the handle, and a second link member attached to the first link member and mounted within the handle, the first link member including a finger which is engageable with the cap.

19. The combination of claim 18, wherein the cap includes a first slot into which the finger is configured to engage when the handle is in the vertical position, and a second slot into which the finger is configured to engage when the handle is in the horizontal position.

20. The combination of claim 12, further comprising a cap attached to the second member and to the handle, the handle being rotatable around the cap.

21. The combination of claim 12, wherein the grip portion forms a pocket into which a user's hand can be inserted.

22. The combination of claim 12, further comprising a spare-tire hub assembly, the first member being attached to the spare-tire hub assembly.

* * * * *